United States Patent [19]

Raczkowski

[11] Patent Number: 4,807,361

[45] Date of Patent: Feb. 28, 1989

[54] CUTTING BLADE LUBRICATION

[76] Inventor: Romuald Raczkowski, 6240 N. Naper, Chicago, Ill. 60631

[21] Appl. No.: 82,309

[22] Filed: Aug. 6, 1987

[51] Int. Cl.$^4$ .................................................. B23D 59/04
[52] U.S. Cl. .................................... 30/123.3; 83/169
[58] Field of Search ............... 30/123.3, 392, 393, 30/394, 166 R; 83/168, 169, 171

[56] References Cited

U.S. PATENT DOCUMENTS

| | | | |
|---|---|---|---|
| 1,544,425 | 6/1925 | Blank | 83/98 |
| 1,958,912 | 5/1934 | Clark | 83/169 X |
| 2,869,231 | 1/1959 | Gury | 83/169 X |
| 2,870,573 | 1/1959 | Scadden | 30/123.3 X |
| 2,881,503 | 4/1959 | Johnson | 83/169 X |
| 3,029,510 | 4/1962 | Marden | 83/169 X |
| 3,041,905 | 7/1962 | Gabriel | 83/169 X |

*Primary Examiner*—Frank T. Yost
*Assistant Examiner*—Michael D. Folkerts
*Attorney, Agent, or Firm*—Paul H. Gallagher

[57] ABSTRACT

A container for lubricating fluid mounted on the body of a jigsaw, with a flexible line leading from the container to a nozzle mounted on the saw blade and reciprocable therewith. The container is sealed and the fluid is forced out through a capillary passage, by reciprocation, and when it is stationary, the fluid is held in by capillary action. The fluid is forced out in the form of a spray onto the cutting blade and workpiece.

22 Claims, 1 Drawing Sheet

U.S. Patent    Feb. 28, 1989    4,807,361
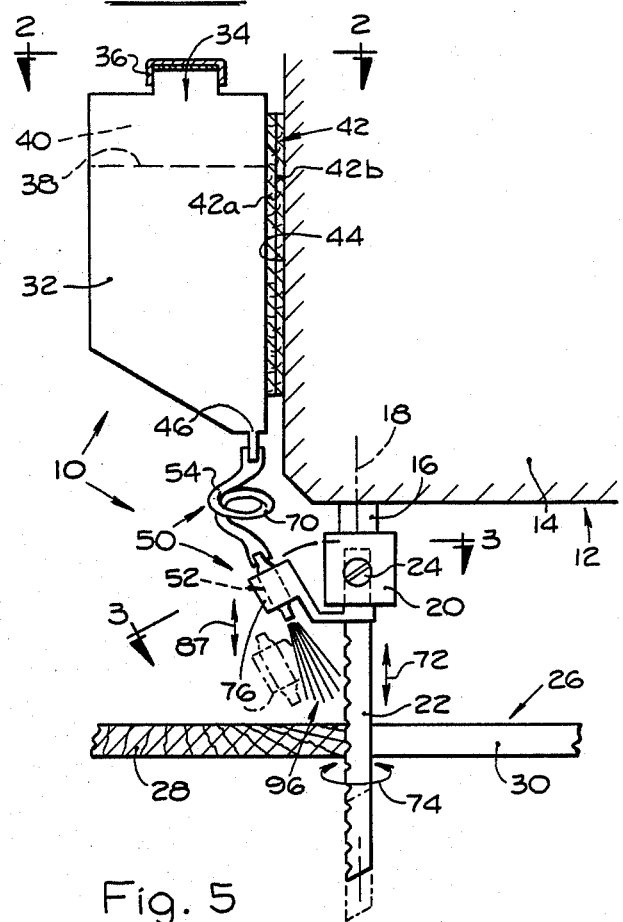
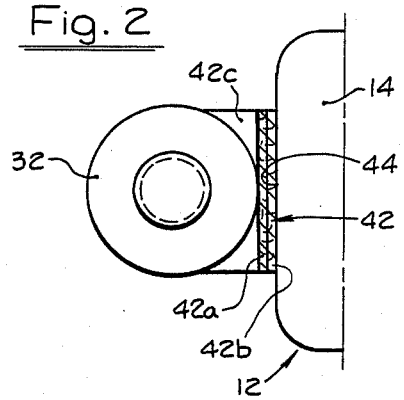
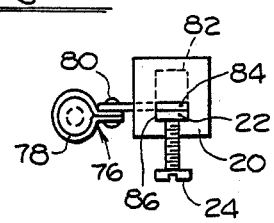
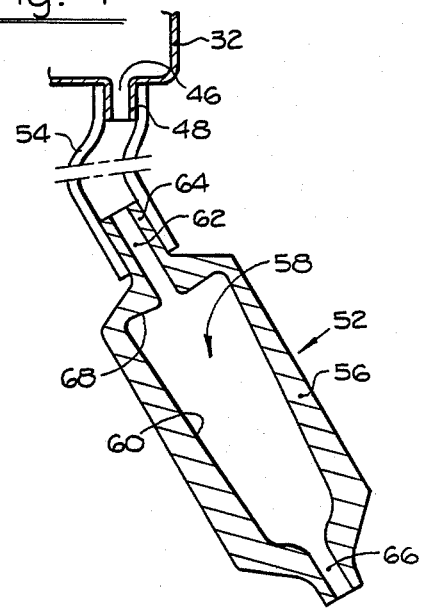
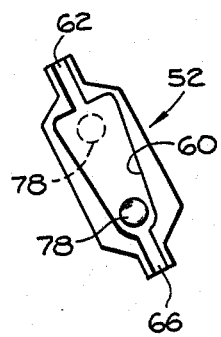
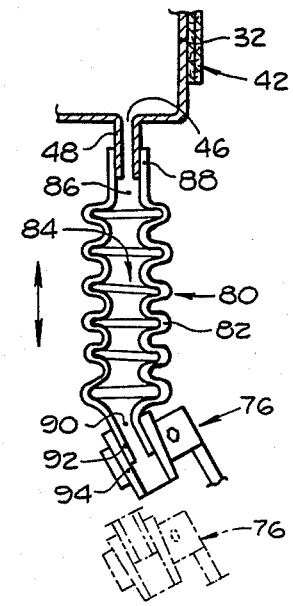

CUTTING BLADE LUBRICATION

FIELD OF THE INVENTION

The invention resides in the field of lubricating the cutting blade in a cutting tool, a principal example of which is the saber saw or the jigsaw. The cutting blade or saw blade becomes greatly heated, because of both the high speed of actuation, and the great mass of material being cut in many instances. It is necessary to cool the blade for effective operation, and it has been extremely difficult heretofore to so cool the blade, and in many cases impossible to do so effectively.

OBJECTS OF THE INVENTION

A broad object of the invention is to provide means and method for lubrication of the cutting blade, or saw blade, in a power cutting tool or power saw, and particularly such having the following features and advantages:

1. The lubricating medium is applied to the cutting blade as controlled directly by the actuation of the machine itself.
2. The lubricating medium is carried by the cutting tool, and hence, in the case of a portable tool, the lubricating step is effectively taken when the tool is utilized in any selected location to which it is moved.
3. The lubricating medium is applied in even and desired and controlled amounts, during actuation of the cutting blade, and automatically shut off when the cutting blade is not actuated.
4. The lubricating medium is in the form of a liquid that is easily applied to the cutting blade and workpiece, and is of non-conducting character, to provide a safety feature in view of the electric character of the tool.

DESCRIPTION OF CERTAIN PREFERRED EMBODIMENTS

In the drawings,

FIG. 1 is an elevational view of the lubricating means of the invention, applied to a cutting tool, with certain elements shown in section.

FIG. 2 is a view taken at line 2—2 of FIG. 1.

FIG. 3 is a view taken at line 3—3 of FIG. 1.

FIG. 4 is a longitudinal sectional view, on an enlarged scale, of the nozzle member of FIG. 1.

FIG. 5 is a smaller scale view of the nozzle body of FIG. 4, with a ball therein.

FIG. 6 is a sectional view of a different embodiment of the nozzle member.

Referring to the drawings in detail, the lubricating unit or device of the present invention is shown in its entirety at 10, in FIG. 1, applied to a portable power tool 12, which in the present instance is a jigsaw. The lubricating unit of the invention is applicable to any kind of tool or machine having a reciprocating element. In the present instance, the jigsaw 12 includes a body 14 having a shank 16 reciprocable on its own longitudinal axis 18. The shank 16 is provided with a chuck 20 in which is detachably mounted a saw blade 22 by means of a clamping set screw 24.

The foregoing tool or machine 12 is of known kind, including the elements thereof individually referred to.

The jigsaw 12 is shown as cutting a workpiece 26 which may be any kind of workpiece which a jigsaw is capable of cutting, but it is pointed out that the device is particularly applicable to cutting plastic material because of the difficulties encountered therewith, such as the heat developed and melting or fusing of the plastic material. The workpiece 26 is in the form of sheet, having a solid uncut portion 28 and a slot 30 cut by the saw blade.

The lubricating unit 10 of the invention includes a container 32 of suitable construction, having a filler opening 34 closed by a removable cap 36 provided with a seal for sealing the interior of the container. A lubricating fluid, which in most cases would be water, is indicated at 38. In the present instance a space 40 is indicated above the body of fluid.

The container 32 is mounted on the body 14 of the tool by a mounting means 42 which preferably consists of a pair of strips or layers 42a, 42b, having interengaging and interconnecting surfaces having tentacles for securing the parts together. A very common connector means of this type is well known under the name Velcro. The layer 42b is secured to the front surface 44 of the tool body 14 (FIG. 2) while the layer 42a is connected to the container 32, both by suitable means such as by an adhesive material. In the case of a round container 32 as in the present case (FIG. 2) a filler strip 42c may be provided to form a flat surface for the strip 42a to be secured thereto, the two strips then having flat interengaging surfaces. This connecting means 42 serves as the principal mounting means for mounting the lubricating unit on the tool, but reference is made hereinbelow to means for securing the nozzle to the tool.

The container 32 has an outlet passage or port 46 (see also FIG. 4) extending through an exterior tubular extension 48.

The lubricating unit 10 includes in addition to the container 32, a component indicated in its entirety at 50 and also referred to as an outlet unit, for convenience and for generic identity. The unit 50 includes a nozzle member 52 and a flexible tube 54. The nozzle member 52 includes a body 56 having a passage 58 therethrough. The passage 58 includes a cavity 60 forming the main part of the passage, and an inlet passage 62 in an exterior tubular extension 64, and an outlet passage 66 forming a nozzle proper. The cavity 60 preferably tapers in outlet direction, and at its inlet end has a transverse surface 68 through which the passage 62 extends and positioned closely adjacent a position perpendicular to the longitudinal direction of the nozzle member. The surface 68 is of substantial dimension, and serves as a significant factor in forcing the lubricating liquid in outlet direction.

The flexible tube 54 at one end is fitted on the tubular extension 48 of the container, and held thereon as by friction, and its opposite end is telescoped over the tubular extension 64 of the nozzle body and held by suitable means, such as by friction or an adhesive material. The flexible tube 54 has a portion forming a coil 70 (FIG. 1) which provides flexibility to the tube in each of two directions, torsional and longitudinal. As noted above, the saw blade 22 is reciprocated in its operation as indicated by the arrow 72 and as noted, along the longitudinal axis 18 of the saw blade, but in certain kinds of jigsaws, the shank 16 and the blade are also movable rotationally about the longitudinal axis 18 as indicated by the arrow 74. The coiled portion 70 of the flexible tube 54 accommodates the torsional movement as well as the longitudinal movement.

The nozzle member 52 is mounted on the shank 16 of the tool by a bracket 76 (FIGS. 1 and 3). The bracket 76 may be of sheet metal, having a band element 78 encircling the nozzle member which is contracted by a suitable rivet or screw 80. The bracket at its opposite end has a flat portion 82 with a tang 84. The chuck 20 has a slot 86 into which the saw blade is fitted and in the present instance the tang 84 is fitted in that slot also, in engagement with the saw blade, and the clamping set screw 24 clamps not only the blade but the bracket 76 therewith.

The nozzle member 52 is thereby carried by the shank 16 and as the shank is reciprocated, the nozzle member is similarly reciprocated, as indicated in dot-dash arrow 87 in FIG. 1, the flexible tube 54 accommodating this reciprocating movement as well as any torsional movement in those cases where such torsional movement occurs, as referred to above.

In the preferred form of the invention, the cavity 60 (FIG. 4) of the nozzle member is free of any other elements, but it is within the scope of the invention to provide a ball in the cavity. FIG. 5 shows a ball 78. Preferably the ball 78 is heavier than water, but it is within the scope of the invention to utilize a ball that is no denser than water and also actually less dense.

FIG. 6 shows a modified form of outlet unit, here designated 80, which supplants the outlet unit 50 of FIG. 1. The outlet unit 80 includes as the main, or substantially sole means, a bellows 82 which is flexible, and made of rubber, or rubber-like material having suitable flexibility and resilience. The bellows has a main interior 84 forming a cavity, an inlet passage 86 defined by a tubular extension 88. The bellows also has an outlet passage 90 defined by a tubular extension 92. In mounting the bellows 82 in place, the tubular extension 88 is fitted on the extension 48 on the container as by friction, and the tubular extension 92 at the outlet end is mounted by means of the bracket 76, there being if desired, a tubular sleeve 94 surrounding the extension 92 within the collar or band 78, for convenience in mounting the outlet end of the bellows. The outlet passage 90 forms the nozzle of the outlet unit.

In the operation of the device, a quantity of lubricating fluid, or water, 38 is placed in the container 32. The container may be filled completely if desired. Various parts of the passage through the outlet unit 50 are of capillary dimensions, and because of the normally sealed filler opening 34, the fluid is prevented from escaping through the outlet unit, such as by dripping.

In the reciprocation of the saw blade and consequent reciprocation of the nozzle member 52, the fluid is ejected in the form of a spray indicated at 96 in FIG. 1. As the nozzle member is moved downwardly, the inlet end surface 68 exerts substantial force in moving the fluid that is in the cavity 60 in corresponding direction, against the tendency of the fluid to retract upwardly, by inertia. Then as the nozzle member moves upwardly, a substantial portion of the fluid in the cavity 60 flows out through the nozzle 66, due to inertia of the fluid. The exact analysis of all of the forces exerted need not be made, it is believed, because in actual operation, the fluid is ejected in the form of the spray.

As increments of the fluid are so ejected or sprayed, a rarefied condition develops in the container, and upon cessation of the spray, air particles find their way through the nozzle 66 and through the passages in the outlet unit into the container. Also, when a quantity of air is present above the fluid, this air becomes at least slightly compressed at times, and the fluid is forced out through the nozzle against the pressure of the air. Certain of the portions of the passage are of capillary dimension, for example preferably the nozzle 66 itself, but other portions as well, which prevents the fluid from escaping while the device is stationary, and the jigsaw is not being used.

The tapering shape of the cavity 60 has an advantageous effect in forming a spray of issuing fluid.

In the case where the ball 78 (FIG. 5) is used, the ball helps to force the fluid out of the cavity, due to its inertia. Some of the fluid passes around the ball in opposite direction, but the ball does provide some effect in forcing the liquid out. A heavy ball is more effective, but a light ball does have some effect in this respect.

Referring to the form of the invention illustrated in FIG. 6, the bellows 82 acts as a pump and correspondingly forces fluid out of the nozzle 90. The upper end of the bellows is secured to the container, and thus relatively stationary, and as the saw blade moves upwardly, it forces the lower end of the bellows upwardly, compressing the bellows and reducing its internal volume. This forces the fluid through the nozzle 90, against the action of the pressure of the air in the space 40 (FIG. 1) at the top of the container, which is relatively compressed.

The bellows 82 is thus more effective in forcing the fluid out than the counterpart outlet unit 50 of FIG. 1. In the case of the bellows, its interior is clear, i.e. no ball or other instrumentality is positioned therein.

The positioning of the lubricating unit with the container uppermost and the nozzle lowermost, assists the movement of the lubricating fluid, by gravity.

The device is not limited to the use of water as a lubricating fluid, although water is the most convenient. The invention also incorporates the use of non-conducting fluid, which in at least many cases would be advisable in view of the electrical nature of the tool. Distillate water is non-conducting, and provides the desired safety feature. Other materials include ethylene glycol, and glycerine.

I claim:

1. A lubricating unit adapted to be mounted on a cutting tool that is adapted for cutting a workpiece and has a body positioned over the workpiece in a normal operation thereof and a downwardly extending cutting blade below the body and reciprocating vertically in cutting the workpiece, said lubricating unit comprising, a container for holding a supply of lubricating liquid and having an outlet passage, means for mounting the container on the body of the cutting tool in a position generally above the cutting blade with the outlet passage directed downwardly, the lubricating unit including means operable, in an inactive and stationary condition of the cutting blade, for holding the lubricating liquid in the container, and an outlet unit having a passage therethrough and connected at a first end with the container with its said passage communicating with the outlet passage of the container, the passage in the outlet unit terminating in a nozzle at a second end of the outlet unit, the outlet unit having its second end connected with and movable with the cutting blade, and with the nozzle also movable with the cutting blade and in position for directing liquid onto the cutting blade, the outlet unit being operable, in response to reciprocation of the cutting blade, for impelling the lubricating liquid from the container through the passage in the outlet unit and through the nozzle onto the cutting blade.

2. A lubricating unit according to claim 1 wherein,
the container is sealed except for the outlet passage, and
the passage through the outlet unit includes at least a portion of capillary dimension operable for preventing escape of lubricating liquid therethrough from the container when the cutting blade is stationary.

3. A lubricating unit according to claim 2 wherein,
the passage through the outlet unit is devoid of any internal elements blocking the passage, and the force that moves the lubricating fluid out through the nozzle includes, as at least a factor thereof, inertia of the lubricating liquid.

4. A lubricating unit according to claim 2 wherein,
the passage through the outlet unit is devoid of any internal elements blocking the passage, and the force that moves the lubricating fluid out through the nozzle includes, as at least a factor thereof, air pressure in the container.

5. A lubricating unit according to claim 2 wherein,
the outlet unit includes a nozzle body through which its said passage extends and a cavity forming a part of and extending longitudinally of the passage, the cavity being of substantially greater transverse dimension than other portions of the passage, and the cavity has a rear end surface disposed transverse to the longitudinal direction of the cavity.

6. A lubricating unit according to claim 5 wherein, the cavity tapers in outlet direction.

7. A lubricating unit according to claim 1 wherein,
the cutting tool includes a body that is relatively vertically stationary notwithstanding vertical reciprocations of the cutting blade, and wherein,
the container is mounted on the body of the cutting tool and thereby relatively vertically stationary, and
the outlet unit includes a flexible and extensible tube between the container and the nozzle.

8. A lubricating unit according to claim 7 wherein,
said tube includes a coiled portion to provide flexibility and extensibility in both torsional and longitudinal movements.

9. A lubricating unit according to claim 5 and including, a ball loose in the cavity.

10. A lubricating unit according to claim 9 wherein, the ball is heavier than water.

11. A lubricating unit according to claim 9 wherein, the ball is at least as light in weight as water.

12. A lubricating unit according to claim 1 wherein,
the liquid impelling means includes a component that varies in internal volume in response to reciprocation of the cutting blade and thereby produces a pumping action and thereby so impells the liquid.

13. A lubricating unit according to claim 12 wherein, said component is a flexible bellows.

14. A lubricating unit according to claim 13 wherein,
the bellows has one end connected directly to the container and thereby held relatively vertically stationary, and constitutes the only means providing relative yieldability between the stationary container and the reciprocating cutting blade.

15. A lubricating unit according to claim 1 wherein the cutting tool is a self-contained unit, and wherein,
the lubricating unit is structurally a complete component, and includes first means for detachably mounting the container on the body of the cutting tool, and second means for detachably mounting the second end of the outlet unit on the cutting blade.

16. A lubricating unit according to claim 15 wherein,
the first mounting means includes elements operable for mounting and holding the container in response to movement of the container toward and into engagement with the body of the cutting tool.

17. A lubricating unit according to claim 15 wherein the cutting tool is of the kind having a chuck in which the cutting blade is normally held by a set screw, and wherein,
the lubricating unit includes a bracket holding the nozzle body and is detachably secured in the chuck by the same set screw.

18. A lubricating unit according to claim 1, in combination with the cutting tool.

19. A lubricating unit according to claim 1 in conjunction with a lubricating liquid wherein,
the lubricating liquid is electrically non-conducting.

20. A lubricating unit according to claim 19 wherein, the lubricating liquid is distillate water.

21. A lubricating unit according to claim 19 wherein, the lubricating liquid is ethylene glycol.

22. A lubricating unit according to claim 19 wherein, the lubricating liquid is glycerine.

* * * * *